United States Patent
Kiefer (12)

(10) Patent No.: US 6,293,723 B1
(45) Date of Patent: Sep. 25, 2001

(54) JACK EXTENSION TUBE FOR A POWER SEAT ADJUSTER MECHANISM FOR A VEHICLE

(75) Inventor: James Kiefer, Grand Rapids, MI (US)

(73) Assignee: RAN Enterprises, Inc., Grand Rapids, MI (US)

(*) Notice: Subject to any disclaimer, the term of this patent is extended or adjusted under 35 U.S.C. 154(b) by 0 days.

(21) Appl. No.: 09/281,686

(22) Filed: Mar. 30, 1999

Related U.S. Application Data

(60) Provisional application No. 60/080,426, filed on Apr. 2, 1998.

(51) Int. Cl.[7] .................................................. F16H 29/20
(52) U.S. Cl. .............................. 403/21; 74/89.15; 74/459
(58) Field of Search ................................. 74/89.15, 459, 74/586; 297/362.14; 411/301, 302, 901; 403/21

(56) References Cited

U.S. PATENT DOCUMENTS

| | | |
|---|---|---|
| 2,966,069 | 12/1960 | Wise . |
| 2,979,965 | 4/1961 | Diebold . |
| 3,049,935 | 8/1962 | Simmons et al. . |
| 3,164,029 | 1/1965 | Martens . |
| 3,178,957 | 4/1965 | Martens . |
| 3,200,664 | 8/1965 | Mauric . |
| 3,206,994 | 9/1965 | Angsten . |
| 3,277,736 | 10/1966 | Goodman . |
| 3,490,062 | 1/1970 | Wagner et al. . |
| 3,590,464 | 7/1971 | Wildi et al. . |
| 3,732,744 | 5/1973 | Rowland . |
| 3,837,755 | 9/1974 | Benoit et al. . |
| 4,127,343 | 11/1978 | Potter . |
| 4,137,784 | 2/1979 | Griffin . |
| 4,266,437 | 5/1981 | Obergfell . |
| 4,552,403 | 11/1985 | Yindra . |
| 4,623,051 | 11/1986 | Lochmoeller . |
| 4,679,451 | 7/1987 | Nakamura . |
| 4,696,512 | 9/1987 | Burnett et al. . |
| 4,817,977 | 4/1989 | Bookbinder . |
| 4,858,481 | 8/1989 | Abraham . |
| 5,136,889 | 8/1992 | Hill et al. . |
| 5,172,601 | 12/1992 | Siegrist et al. . |
| 5,174,167 | 12/1992 | Hill et al. . |
| 5,312,198 | 5/1994 | Kiefer . |
| 5,346,045 | 9/1994 | Bennett et al. . |
| 5,528,951 | * 6/1996 | Takahashi et al. ............... 74/89.15 X |
| 5,536,100 | 7/1996 | Kiefer . |
| 5,542,744 | 8/1996 | Bathrick . |
| 5,606,790 | 3/1997 | Laue . |
| 5,797,293 | * 8/1998 | Chaban ............................... 74/89.15 |
| 5,797,574 | * 8/1998 | Brooks et al. ................... 74/89.15 X |
| 5,911,789 | * 6/1999 | Keipert et al. ................... 74/89.15 X |

\* cited by examiner

*Primary Examiner*—Lynne H. Browne
*Assistant Examiner*—John R. Cottingham
(74) *Attorney, Agent, or Firm*—Rader, Fishman, Grauer & McGarry

(57) ABSTRACT

A jack extension tube preferably for vehicles is provided which comprises an elongated tube with a threaded nut securely mounted therein, and a jack screw received in an open end of the tube and threadably received in the threaded nut. The tube has a first flange extending inwardly adjacent an inner end of the threaded nut and a second flange extending inwardly adjacent an outer end of the threaded nut whereby the threaded nut is securely retained within the elongated tube between the first and second flanges. The threads on the threaded nut can be involute threads to reduce noise, wear and chucking between the nut and the screw. The threaded nut can be formed of a rigid synthetic resin material. Further, a stop can be provided on one of the jack screw inner end and the threaded nut inner end whereby the stop prevents the threads on the jack screw from being separated from the threads on the threaded nut during rotation of the jack screw relative to the threaded nut and allowing for a low starting torque when the screw is rotated in a reverse direction.

34 Claims, 2 Drawing Sheets

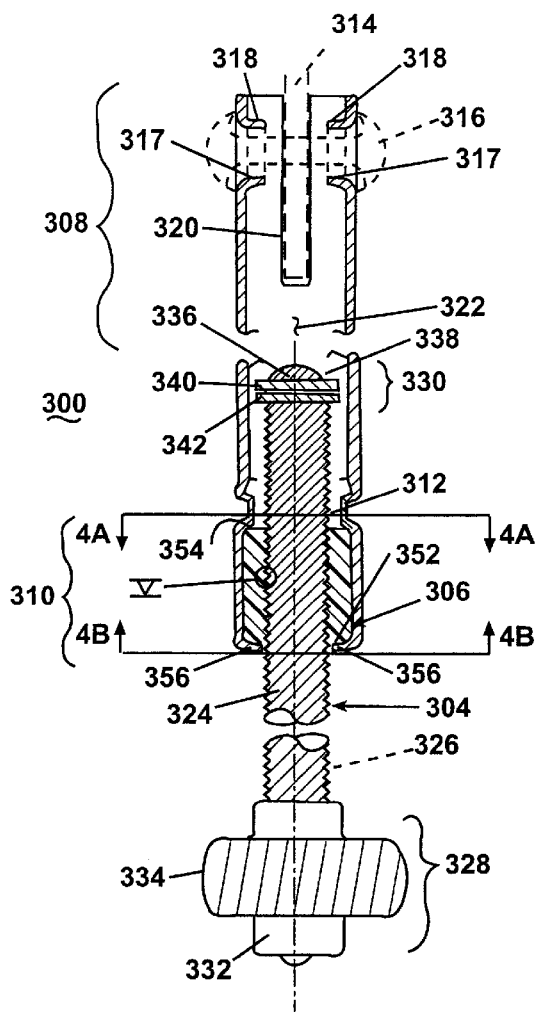
Fig. 1
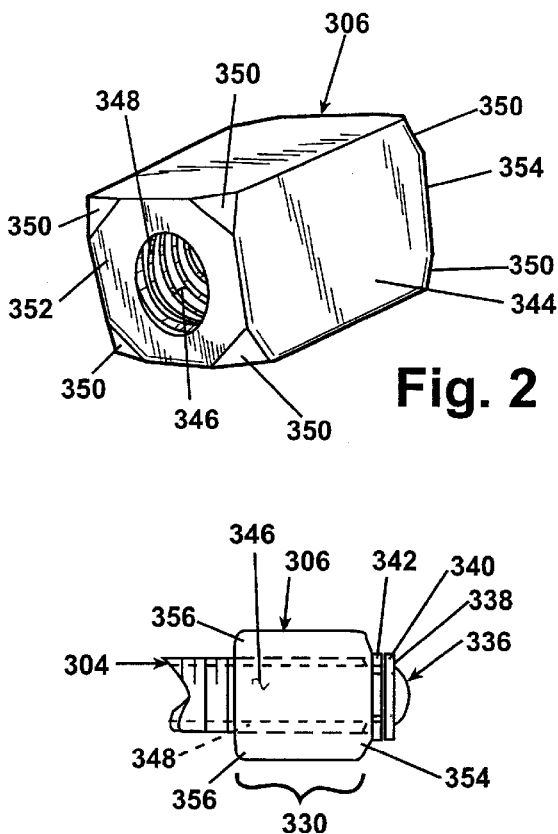
Fig. 2
Fig. 3
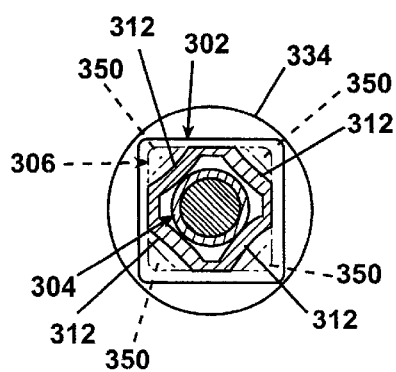
Fig. 4A
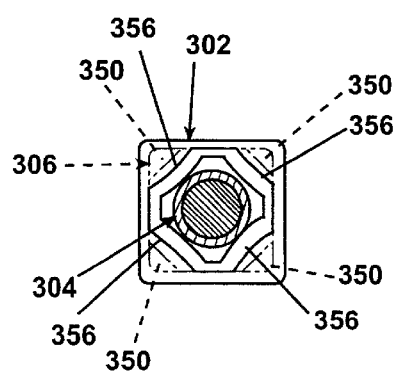
Fig. 4B

JACK EXTENSION TUBE FOR A POWER SEAT ADJUSTER MECHANISM FOR A VEHICLE

CROSS-REFERENCE TO RELATED APPLICATIONS

This application claims the benefit of U.S. Provisional Application Ser. No. 60/080,426, filed on Apr. 2, 1998.

BACKGROUND OF THE INVENTION

1. Field of the Invention

This invention relates to a jack extension tube for use on power seat adjuster mechanisms for vehicles and, in particular, to a jack extension tube having low-noise operational characteristics and a low-torque internal stop-release and which can be mounted to an existing link in the seat adjuster mechanism by a fastener such as a rivet.

2. Description of Related Art Jack extension tubes are used in power seat adjuster mechanisms for vehicles to operably connect a vehicle seat track or seat back to a powering mechanism to move the seat or any component thereof in a desired direction via a link member. By varying the length of the tube, jack extension tubes allow a particular seat adjuster mechanism to be used with seats on different vehicle models. Further, the tubular construction allows cost savings and weight savings over a solid machined rod. Two known prior art jack extension tubes are shown in greater detail in commonly-assigned U.S. Pat. Nos. 5,312,198 and 5,536,100 issued May 17, 1994 and July 16, 1996, respectively. Typically, the link member is mounted to the extension tube by a fastener such as a shoulder bolt with an attached nut, a pin, a rivet and the like.

However, because these extension tubes are often manufactured solely from steel or other metal components, some prior jack extension tubes have been known to make excessive amounts of noise during operation—more than is aesthetically pleasing while adjusting the seat in the passenger compartment of the vehicle. Further, prior extension tubes are often subject to "chucking"—looseness between components of the jack extension tube which contributes to unacceptable noise and vibration.

SUMMARY OF THE INVENTION

The invention generally relates to a jack extension tube for vehicles comprising an elongated tube having a first section with an open end and a second section spaced from the first section. A threaded nut is mounted in the first section and a mounting flange is provided in the second section which is adapted to receive a fastener. A jack screw is received in the first section open end and is threadably received in the threaded nut. The jack screw can include an exposed end defining a gear and an opposite end configured so that the jack screw is retained in the threaded nut and cannot be fully unscrewed from the threaded nut.

In one embodiment, the invention relates to the tube having a first flange extending inwardly adjacent an inner end of the threaded nut and a second flange extending inwardly adjacent an outer end of the threaded nut whereby the threaded nut is securely retained within the elongated tube between the first and second flanges.

In another embodiment, the threads on the threaded nut are preferably involute shaped threads.

In an additional embodiment, the threaded nut is preferably formed of a rigid synthetic resin material.

In a further embodiment, a stop is preferably provided on one of the jack screw inner end and the threaded nut inner end wherein the stop comprises a shoulder on the jack screw inner end and at least one ring received on the jack screw between the jack screw inner end and the threaded nut inner end in abutment with the shoulder whereby the at least one ring is prevented from being removed axially from the jack screw inner end by the shoulder. The stop thereby prevents the threads on the jack screw from being separated from the threads on the threaded nut during rotation of the jack screw relative to the threaded nut.

The first flange can comprise a circumferential flange. The first flange can be integrally formed with the tube. The first and second flanges are preferably formed closely adjacent ends of the threaded nut whereby the first and second flanges prevent movement of the threaded nut within the elongated tube. The second flange is preferably formed at the first section open end. The second flange can be integrally formed with the first section open end.

The threaded nut can be formed of a rigid synthetic resin material which can be reinforced with fibers and formed of a reinforced nylon material. The nut and its associated threads can be injection molded. The threads on the threaded nut can be involute shaped threads. The threads on the threaded nut and the threads on the jack screw can form a gap therebetween. The threads on the threaded nut can have an arcuate surface in abutment with the threads on the jack screw whereas the threads on the jack screw can have a standard helical thread. The threaded nut and the elongated tube can be rectangular in cross section. The threaded nut has chamfered portions adjacent each end in abutment with the first and second flanges of the tube.

The stop can comprise a first ring received on the jack screw in abutment with the jack screw inner end and a second ring received on the jack screw inwardly of the first ring. The first ring and the second ring can be made from different materials. At least one of the first ring and the second ring is preferably formed from a synthetic resin material. At least one of the first ring and the second ring can be made from a self-lubricating synthetic resin material. At least one of the first ring and the second ring is preferably made from a material selected from the group consisting of polyethlyene, polypropylene, and nylon. At least one of the first ring and the second ring is preferably formed from the same material as the screw.

BRIEF DESCRIPTION OF THE DRAWINGS

The invention will now be described with reference to the drawings in which:

FIG. 1 is a longitudinal cross-sectional view of an extension tube assembly for a seat adjuster mechanism according to the invention comprising a housing which securely mounts a muffling nut which, in turn, threadably receives a jack screw;

FIG. 2 is a perspective view of the muffling nut shown in the extension tube assembly of FIG. 1;

FIG. 3 is an elevational view of the muffling nut of FIGS. 1–2 with the screw extending therethrough;

FIG. 4A is a cross-sectional view of the extension tube assembly taken along lines 4A—4A of FIG. 1, showing flanges of the housing extending inwardly adjacent to one end of the muffling nut for securely mounting the nut within the housing;

FIG. 4B is a cross-sectional view of the extension tube assembly taken along lines 4B—4B of FIG. 1 showing flanges of the housing extending inwardly adjacent to an end opposite the end shown in FIG. 4A for securely mounting the nut within the housing;

DETAILED DESCRIPTION OF THE PREFERRED EMBODIMENTS

Figure 6:
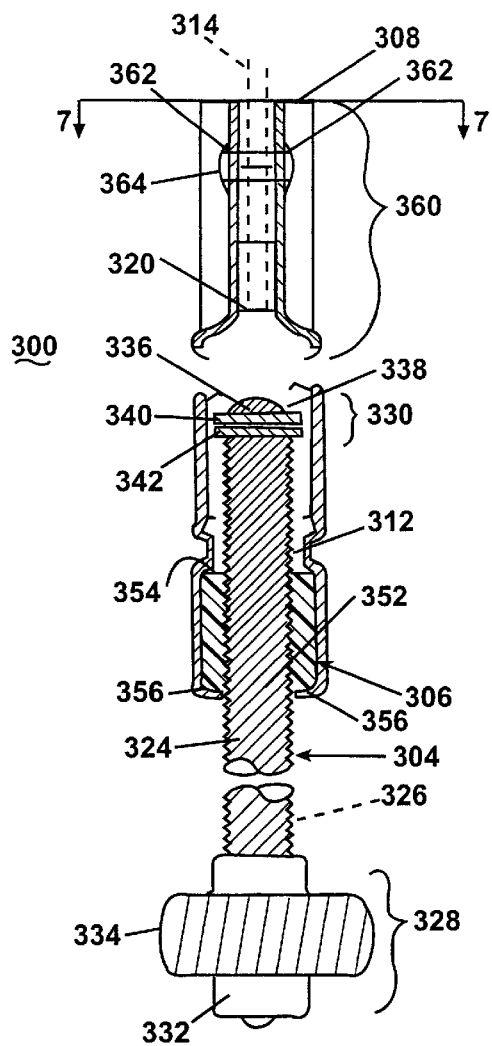
FIG. 6 is a front elevational view of an alternative embodiment of an extension tube assembly according to the invention and having a necked-down portion for mounting a link in the seat adjuster mechanism.

Referring to the drawings and to FIGS. 1–4 in particular, an improved jack extension tube 300 is shown comprising a housing 302, a screw 304 and a muffler such as a muffling nut 306.

The housing 302 comprises an elongated tubular member, preferably having a rectangular cross section, with a first end 308 and a second end 310. At least one inwardly-extending flange 312 is defined intermediate the first and second ends 308 and 310 and preferably more closely adjacent to the second end 310.

The first end 308 of the housing 302 is preferably arranged to pivotally receive a link member 314 shown in phantom lines in FIG. 1. To this end, the housing 302 has a pair of opposed reinforced openings 317 formed by a pair of inwardly-directed extruded annular flanges 318 which are described more fully in the commonly assigned U.S. Pat. No. 5,312,198 and is incorporated herein by reference. The openings 317 are adapted to receive a fastener such as a rivet 316 therein. An elongated slot 320 is also formed in the second end 308 of the housing 302 and extends longitudinally toward the first end 310 of the housing 302. The elongated slot 320 defines a receiving area for the link 314. The link member 314 is pivotally mounted to the first end 308 of the housing 302 by the rivet 316 or any other known fastener such as a shoulder bolt, a pin and the like.

The link member 314 includes an opposite end (not shown) which is interconnected within a conventional seat adjuster mechanism which is well known in the seat adjuster art. The seat adjuster mechanism can be any mechanism used to move, orient, or translate a vehicle seat with respect to the passenger compartment of a vehicle, such as adjusters which extend or retract a seat longitudinally or vertically within the vehicle interior, a recliner mechanism for altering the angular configuration of the vehicle seat, and other similar mechanisms.

The components of the extension tube assembly, such as the housing 302, screw 304, and muffling nut 306, are held together more securely than prior art jack extension tubes, making failure of the extension tube assembly 300 less likely.

The housing 302 defines an internal longitudinal chamber 322 along the length thereof. The housing 302 is preferably formed from a rigid metal, such as steel, aluminum, or an alloy thereof, although it is contemplated that the housing 302 can also be formed from a synthetic resin material which has sufficient rigidity to maintain the stresses encountered by the housing 302.

Figure 5:
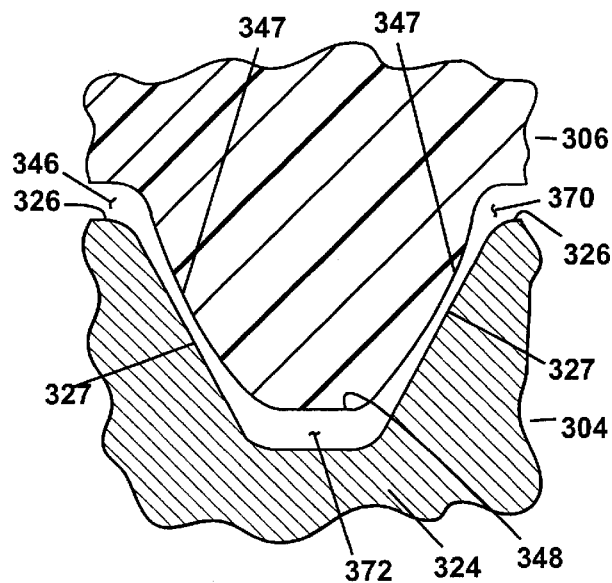
FIG. 5 is an enlarged cross-sectional view of the area marked V in FIG. 1 showing the interengagement of threads on the screw and the nut of the jack extension tube of FIG. 1.

As shown in FIG. 1 and in greater detail in FIG. 5, the screw 304 preferably comprises an elongated shaft 324 having a spirally-wound thread 326 thereon which extends between a first end 328 and a second end 330 of the screw 304. The screw 304 is preferably constructed from a rigid metal, such as steel or aluminum, and the pitch of the threads 326 is preselected to provide a predetermined conversion of rotary-to-linear motion of the screw 304 with respect to the housing 302. As shown in FIG. 5, the threads 326 of the screw 304 are preferably a standard helical thread with angularly-configured threads 327 thereon.

The first end 328 of the screw 304 is provided with a flange 332 non-rotatably mounted to the first end 328 of the screw 304 in a conventional manner. The flange 332 preferably includes any known engagement portion, such as a gear 334, adapted to be rotatably driven by a conventional seat adjuster motor (not shown). It will be understood that the member 334 can comprise other known mechanical engagement elements, such as a pulley, a transmission or a gearbox, or any other suitable component which can be interconnected to the seat adjuster motor.

As shown in FIG. 1 and in greater detail in FIG. 3, the second end 330 of the screw 304 preferably comprises a head 336 which defines a shoulder 338 thereon. First and second rings 340 and 342 are rotatably received on the shaft 324 of the screw 304 so that the first ring 340 abuts the shoulder 338 of the head 336, and the second ring 342 is located axially inwardly of the first ring 340. The rings 340 and 342 are integral to an inventive feature of the extension tube assembly 300 whereby the screw 304 requires very little stop-release torque when abutted against the muffling nut 306. In the example extension tube assembly 300 shown herein, the first and second rings 340 and 342 preferably comprise a synthetic resin bushing and a metal washer, respectively.

As best shown in FIG. 1 and in greater detail in FIG. 2, the muffling nut 306 comprises an elongated body 344 preferably shaped to coincide with a portion of the interior chamber 322 of the housing 302 located between the flanges 312 and the second end 310 thereof. In this illustrated embodiment, the muffling nut is square in cross section. The muffling nut 306 also includes a longitudinal threaded bore 346 with internal threads 348 that correspond in pitch to the threads 326 on the screw 324 so that the bore 346 is adapted to receive the screw 304. As needed, the body 344 of the muffling nut 306 can be formed with chamfered portions 350 on front and rear faces 352 and 354 thereof to aid in the retention of the muffling nut 306 within the housing 302.

The muffling nut 306 is preferably made from a polymer composite resin, such as Celstran No. N66G40.02.4, and is preferably injection molded to the desired shape. The material comprising the muffling nut 306 is preferably any type of rigid material which is capable of withstanding at least $8 \times 10^3$ tensile psi. Further, it is preferable that the material have a tensile modulus of greater than $0.40 \times 10^6$ psi. It has been found that a nylon material which has been reinforced with at least 30% glass fibers produces preferable results in preventing the screw 304 from being separated from the nut 306 during use. For example, the above-identified Celstran material has 40% glass fibers in a nylon base, a tensile strength of approximately $33.7 \times 10^3$ psi and a tensile modulus of approximately $1.7 \times 10^6$ psi. Further, it has also been found that a lower-cost material comprising a glass-filled acetal material of approximately a 33% ratio can also produce desirable results. An example of this material is available under the trade name Zytel 70G33 HSIL. Each of the above materials can be provided with a lubricant for additional beneficial results in the interaction with the screw 304.

The muffling nut 306 is preferably molded to the desired shape including the threads 348 on the internal bore 346 thereof. Although the threads 348 can be a conventional helical thread aligned with the thread 327 of the threads 326 of the screw 304, it has been found that an "involute" screw thread such as that shown at 348 in FIG. 5 provides beneficial results. A characteristic of the involute screw thread is an arcuate surface 347 which preferably has a large radius of curvature compared to the overall height and pitch of the threads 348 of the nut 306. The configuration of the involute screw threads 348 is shown in detail in FIG. 5. A gap 370 is preferably defined adjacent to a distal edge of each thread 326 of the screw 304 between a proximal edge of each screw thread 348 of the nut 306. Further, a gap 372 is defined adjacent a distal edge of each thread 348 of the nut 306 and a proximal edge adjacent each thread 326 of the screw 304. Further, the involute screw threads on the nut 306 shown by the arcuate surface 347 on each thread 348 provide a reduced contact surface of the threads 348 on the nut 306 with the threads 326 on the screw 304. The gaps 370 and 372 cooperate with the involute screw threads 348 on the nut 306 to provide a reduced contact surface of the nut 306 with the screw 304 at the points of interengagement between the threads of each component. This configuration proves advantageous in eliminating "chucking" between the screw 304 and the nut 306. This reduction in chucking reduces the looseness between the screw 304 and nut 306 which thereby reduces noise and vibration during operation of a power seat adjusting assembly in which the jack extension tube according this invention is incorporated.

To create a subassembly of the screw 304 and muffling nut 306, the threads 326 on the screw 304 are mounted within the threaded bore 346 of the muffling nut 306 so that the threads 348 of the bore 346 engage the threads 326 of the shaft 324. The rings 340 and 342 are located between the shoulder 338 of the head 336 of the screw 304 and the rear face 354 of the muffling nut 306.

As shown in FIGS. 1 and 4A, the subassembly can then be mounted to the housing 302 by inserting the muffling nut 306 within the open second end 310 of the housing 302 so that the rear face 354 of the muffling nut 306 abuts the flanges 312. The muffling nut 306 thereby occupies the portion of the internal chamber 322 located between the flanges 312 and the second end 310 of the housing 302.

After insertion of the muffling nut 306 into the portion of the interior chamber 322 between the flanges 312 and the second end 310 of the housing 302, end portions 356 of the second end 310 of the housing 302 are roll formed or folded around the chamfered portions 350 on the front face 352 of the muffling nut 306 as shown in FIG. 1 and in greater detail in FIG. 4B. Thus, the muffling nut 306 is securely mounted within the portion of the interior chamber 322 between the flanges 312 and the end portions 356 located at the second end 310 of the housing 302.

This retention of the muffling nut 306 within the housing 302 provides a more secure mounting of the muffling nut 306 within the housing 302. The screw 304 and muffling nut 306 subassembly are prevented from being inadvertently removed from the housing 302 when undue forces are applied to the extension tube assembly 300 such as during a vehicle collision.

It will be understood that the head 336, shoulder 338, and the rings 340 and 342 cooperate, either alone or in combination, to define a stop for the second end 330 of the screw 304 relative to the rear face 354 of the muffling nut 306. Specifically, when the second end 330 of the screw 304 approaches the rear face 354 of the muffling nut 306 (so that the tube 300 is in the fully extended position) the stop prevents the second end 330 of the screw 304 from traversing into the bore 346 of the muffling nut 306 and along the threads 348 thereof. The abutment of the stop against the rear face 354 of the muffling nut 306 thereby prevents the screw 304 from becoming separated from the threaded engagement with the muffling nut 306 due to overtravel of the screw 304 with respect to the muffling nut 306 which, in turn, prevents the extension tube assembly 300 from becoming inoperable if the separation occurs.

As described above, the link member 314 is pivotally mounted at the first end 308 of the housing 302 by a known fastener, such as a rivet 316 mounted through the link member 314 within the openings 317, so that the link member 314 can pivot relative to the slot 320. Further, the gear 334 located at the first end 328 of the screw 304 is operably interconnected with a conventional motor for the seat adjuster mechanism.

During operation of the seat adjuster mechanism, the motor is selectively actuated by a user to perform a particular adjusting operation for a vehicle seat. When the motor is actuated by the user, rotation is imparted to the gear 334 which, in turn, rotates the screw 304. Due to the engagement of the threads 326 of the screw 304 with the threads 348 of the muffling nut 306, the muffling nut 306 and the associated housing 302 move longitudinally along the screw 304.

It will be understood that the movement of the housing 302 along the screw 304 is limited at fully retracted and fully extended positions and can be preselected by sizing the housing 302 and screw 304 accordingly and mounting the screw 304 to the housing 302 to produce a desired length of travel for the tube 300.

In the fully extended position, the second ring 342 on the second end of the screw 304 contacts the rearward face 354 of the muffling nut 306. The first ring 340 is retained between the second ring 342 and the shoulder 338 of the head 336 located at the second end 330 of the screw 304. This fully retracted position is shown in greater detail in FIG. 3.

Preferably, the first and second rings 340 and 342 are formed from different materials. The first ring or bushing 340 is preferably formed from a self lubricating synthetic resin, such as polyethlyene, polypropylene, nylon, or a composite similar to the material of the muffling nut 306. The second ring or washer 342 is preferably formed from metal such as steel or aluminum or a material having properties similar to that of the screw 304. Thus, in the fully extended position, the second ring 342 is abutted between the first ring 340 and the muffling nut 306.

This interengagement of the differing materials of these components accomplishes some important functions. First, as the screw 304 approaches the fully extended position, the head 336 can be smoothly tightened against the muffling nut 306 with one or both of the first and second rings 340 and 342 slipping slightly. Second, as the seat adjuster motor is actuated in reverse to retract the head 336 of the screw 304 from abutment with the muffling nut 306, the rings 340 and 342 smoothly disengage from abutment with the rear face 354 of the muffling nut 306 with little torque required due to the self-lubricating nature of the second ring 342.

Thus, the screw 304 smoothly decreases speed and stops when the rings 340 and 342 abut the rear face 354 of the muffling nut 306 at the fully retraced position. Conversely, the head 336 of the screw 304 is easily moved out of abutment with the rear face 354 of the muffling nut 306 when the screw 304 is extended therefrom. Binding and/or damage to any of the components contained in the jack extension tube 300 are substantially reduced.

The muffling nut 306 also provides the important function of reducing noise during retraction and extension of the housing 302 with respect to the screw 304. The different materials of the screw 304 and the muffling nut 306 reduce noise generated as the threads 326 of the screw 304 move along the threads 348 of the muffling nut 306. Further, the involute thread configuration on one or both of the threads 326 and 348 of the screw 304 and nut 306, respectively, aids this reduction in noise and prevents chucking.

For example, the embodiment described herein has a metal screw 304 and a synthetic resin muffling nut 306. The friction, and therefore the noise, between the metal screw 304 and the synthetic resin muffling nut 306 is substantially less than the friction between a pair of metal components.

It will be understood that any known sound-deadening materials can be used for the muffling nut 306, can be impregnated therein, or can line the threads 348 of the muffling nut 306 to provide additional reduction of the noise emitted from the extension tube assembly 300 during operation thereof due to the rotation of the screw 304 with respect to the housing 302.

Figure 7:
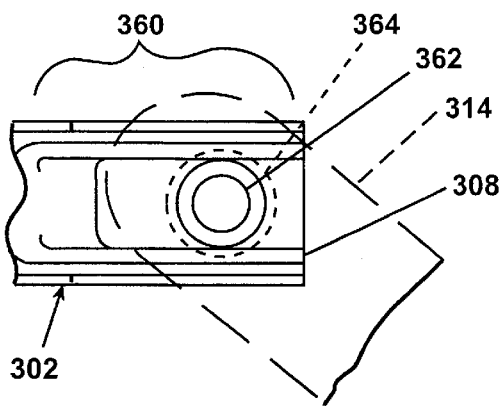
FIG. 7 is a side elevational view of the extension tube of FIG. 6 showing the mounting of a link member within openings in phantom outlines.

An alternative embodiment of the extension tube 300 is shown in FIGS. 6–7. It will be understood that like reference numbers identify elements common to the embodiment shown in FIGS. 6–7 and the previous embodiment shown in FIGS. 1–5.

The alternative embodiment of the extension tube includes a necked-down portion 360 located at the first end 308 of the housing 302. The necked-down portion 360 has a pair of inwardly-extending flanges 362 which are configured to receive a rivet 364 whereby a standard tool or press can be used to pivotally mount the link member 314 within the slot 320. The remainder of the structure and operation of the extension tube shown in FIGS. 6–7 operate the same as that shown in the previous embodiment of FIGS. 1–5.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention which is defined by the appended claims.

What is claimed is:

1. In a jack extension tube for vehicles comprising:
   an elongated tube having a first section with an open end and a second section spaced from the first section;
   a nut mounted in the first section and having a threaded bore extending between front and rear faces, the nut fitting snugly within the elongated tube;
   a mounting flange in the second section adapted to receive a fastener; and
   a jack screw received in the first section open end and threadably received in the threaded bore of the nut, the jack screw including an exposed end defining a gear and an opposite end configured with a stop so that the jack screw is retained in the threaded nut and cannot be fully unscrewed from the threaded nut;
   the improvement comprising:
      the nut and the tube are of complementary multi-sided cross section; and
      the tube has a first flange extending inwardly in abutting relationship to the rear face of the nut and a second flange extending inwardly in abutting relationship with front face of the nut to prevent axial movement of the nut within the elongated tube; whereby the nut is securely retained within the elongated tube between the first and second flanges.

2. The jack extension tube of claim 1 wherein the first flange comprises a circumferential flange.

3. The jack extension tube of claim 1 wherein the first flange is integrally formed with the tube.

4. The jack extension tube of claim 1 wherein the second flange is formed at the first section open end.

5. The jack extension tube of claim 1 wherein the second flange is integrally formed with the first section open end.

6. The jack extension tube of claim 1 wherein the nut is formed of a rigid synthetic resin material.

7. The jack extension tube of claim 6 wherein the synthetic resin material is reinforced with fibers.

8. The jack extension tube of claim 6 wherein the synthetic resin material is a reinforced nylon material.

9. The jack extension tube of claim 6 wherein the nut and its associated threads are injection molded.

10. In a jack extension tube for vehicles comprising:
    an elongated tube having a first section with an open end and a second section spaced from the first section;
    a nut mounted in the first section and having a threaded bore extending between front and rear faces and the threads on the threaded bore of the nut are involute in configuration;
    a mounting flange in the second section adapted to receive a fastener; and
    a jack screw received in the first section open end and threadably received in the threaded bore of the nut, the jack screw including an exposed end defining a gear and an opposite end configured with a stop so that the jack screw is retained in the threaded nut and cannot be fully unscrewed from the threaded nut;
    the improvement comprising:
       the tube has a first flange extending inwardly in abutting relationship to the rear face of the nut and a second flange extending inwardly in abutting relationship with front face of the nut to prevent axial movement of the nut within the elongated tube;
       whereby the nut is securely retained within the elongated tube between the first and second flanges.

11. The jack extension tube of claim 10 wherein the threads on the threaded bore of the nut and the threads on the jack screw form an addendum gap and a dedendum gap therebetween.

12. In a jack extension tube for vehicles comprising:
    an elongated tube having a first section with an open end and a second section spaced from the first section;
    a nut mounted in the first section and having a threaded bore extending between front and rear faces and the threads on the threaded bore of the nut have an arcuate surface in abutment with the threads on the jack screw;
    a mounting flange in the second section adapted to receive a fastener; and
    a jack screw received in the first section open end and threadably received in the threaded bore of the nut, the jack screw including an exposed end defining a gear and an opposite end configured with a stop so that the jack screw is retained in the threaded nut and cannot be fully unscrewed from the threaded nut;
    the improvement comprising:
       the tube has a first flange extending inwardly in abutting relationship to the rear face of the nut and a second flange extending inwardly in abutting relationship with front face of the nut to prevent axial movement of the nut within the elongated tube;

whereby the nut is securely retained within the elongated tube between the first and second flanges.

13. The jack extension tube of claim 12 wherein the threads on the jack screw have a standard helical thread.

14. The jack extension tube of claim 1 wherein the nut and the elongated tube are rectangular in cross section.

15. The jack extension tube of claim 1 wherein the nut has chamfered portions adjacent each end in abutment with the first and second flanges of the tube.

16. In a jack extension tube for vehicles comprising:

an elongated tube having a first section with an open end and a second section spaced from the first section;

a nut mounted in the first section and having a threaded bore;

a mounting flange in the second section of the elongated tube adapted to receive a fastener; and a jack screw received in the first section open end and threadably received in the threaded bore of the nut, the jack screw including an exposed end defining a gear and an opposite end configured so that the jack screw is retained in the threaded nut and cannot be fully unscrewed from the threaded nut;

the improvement comprising:
wherein the threads on the threaded bore of the nut are involute along the length thereof.

17. The jack extension tube of claim 16 wherein the nut is formed of a rigid synthetic resin material.

18. The jack extension tube of claim 17 wherein the synthetic resin material is reinforced with fibers.

19. The jack extension tube of claim 17 wherein the synthetic resin material is a reinforced nylon material.

20. The jack extension tube of claim 17 wherein the nut is injection molded.

21. The jack extension tube of claim 20 wherein the involute threads of the nut are injection molded.

22. The jack extension tube of claim 16 wherein the threads on the threaded bore of the nut and the threads on the jack screw form an addendum gap and a dedendum gap therebetween.

23. The jack extension tube of claim 16 wherein the threads on the threaded bore of the nut have a convex arcuate surface in abutment with the threads on the jack screw.

24. The jack extension tube of claim 16 wherein the threads on the jack screw have a standard helical thread.

25. The jack extension tube of claim 16 wherein the nut and the elongated tube are rectangular in cross section.

26. The jack extension tube of claim 25 wherein the nut has chamfered portions adjacent each end in abutment with the first and second flanges of the tube.

27. In a jack extension tube for vehicles comprising:

an elongated tube having a first section with an open end and a second section spaced from the first section;

a threaded nut fixedly mounted in the first section of the elongated tube and having a threaded bore extending between front and rear faces;

a mounting flange in the second section of the elongated tube adapted to receive a fastener;

a jack screw received in the first section open end and having an inner end threadably received in, and extending through, the threaded bore of the nut, the jack screw inner end extending beyond the nut rear face; and a stop on the jack screw inner end to retain the jack screw in the nut when the jack screw is unscrewed to a predetermined position relative to the nut, wherein the stop comprises at least one ring mounted on the jack screw adjacent the inner end thereof;

the improvement comprising:
the at least one ring and the first section of the elongated tube are configured so that the at least one ring is adapted to abut the rear face of the nut when the jack screw is unscrewed to the predetermined position;

whereby the stop prevents the threads on the jack screw from being separated from the threads on the threaded bore of the nut during rotation of the jack screw relative to the threaded nut at the predetermined position.

28. The jack extension tube of claim 27 wherein the stop comprises a first ring and a second ring received on the jack screw in juxtaposed relationship.

29. The jack extension tube of claim 28 wherein the first ring and the second ring are made from different materials.

30. The jack extension tube of claim 28 wherein at least one of the first ring and the second ring is formed from a synthetic resin material.

31. The jack extension tube of claim 28 wherein at least one of the first ring and the second ring is made from a self-lubricating synthetic resin material.

32. The jack extension tube of claim 28 wherein at least one of the first ring and the second ring is made from a material selected from the group consisting of polyethylene, polypropylene, and nylon.

33. The jack extension tube of claim 28 wherein at least one of the first ring and the second ring is formed from the same material as the nut to avoid sticking of the jack screw in the predetermined position.

34. The jack extension tube of claim 27 wherein at the at least one ring and the nut are made from a self-lubricating synthetic resin material to avoid sticking of the jack screw in the predetermined position.

* * * * *